(12) United States Patent
Walker et al.

(10) Patent No.: US 7,487,614 B1
(45) Date of Patent: Feb. 10, 2009

(54) RADIO CONTROLLED GILL NET RECOVERY TRANSMITTERS

(76) Inventors: Seth Walker, 48 Munson Ct., Melville, NY (US) 11747; John Mizzi, 30 Cramer Rd., Poughkeepsie, NY (US) 12603

( * ) Notice: Subject to any disclaimer, the term of this patent is extended or adjusted under 35 U.S.C. 154(b) by 291 days.

(21) Appl. No.: 11/342,355

(22) Filed: Jan. 27, 2006

Related U.S. Application Data

(60) Provisional application No. 60/664,147, filed on Mar. 22, 2005, provisional application No. 60/647,833, filed on Jan. 27, 2005.

(51) Int. Cl.
*A01K 69/02* (2006.01)
*A01K 75/00* (2006.01)

(52) U.S. Cl. .................................. 43/10; 43/7

(58) Field of Classification Search ............... 43/10, 43/7; 411/11, 1, 23–26; 367/4; 340/573.2, 340/984, 309.8, 309.16, 539.13
See application file for complete search history.

(56) References Cited

U.S. PATENT DOCUMENTS

| | | | | | |
|---|---|---|---|---|---|
| 83,493 | A | * | 10/1868 | Harper | 43/10 |
| 713,364 | A | * | 11/1902 | Uhlenhart | 43/7 |
| 756,438 | A | * | 4/1904 | Uhlenhart | 43/7 |
| 1,333,224 | A | * | 3/1920 | Sperry | 114/240 E |
| 1,719,838 | A | * | 7/1929 | Haselton | 43/23 |
| 1,799,576 | A | * | 4/1931 | Wildhaber | 340/984 |
| 2,422,337 | A | * | 6/1947 | Chilowsky | 441/26 |
| 2,470,783 | A | * | 5/1949 | Mead | 441/8 |
| 2,479,021 | A | * | 8/1949 | Perkins | 441/8 |
| 2,497,852 | A | * | 2/1950 | Arenstein | 441/11 |
| 2,791,785 | A | * | 5/1957 | Metts | 441/8 |
| 3,085,263 | A | * | 4/1963 | Yurkinas et al. | 441/8 |
| 3,148,618 | A | * | 9/1964 | Richard | 367/4 |
| 3,165,853 | A | * | 1/1965 | Ansell | 43/7 |
| 3,170,438 | A | * | 2/1965 | Coleman et al. | 116/211 |
| 3,226,670 | A | * | 12/1965 | Richard | 367/4 |
| 3,280,549 | A | * | 10/1966 | Hsu | 441/9 |
| 3,487,486 | A | | 1/1970 | Leonard et al. | 9/8 |
| RE27,862 | E | * | 1/1974 | Silchenstedt | 43/8 |
| 3,848,226 | A | * | 11/1974 | Perez | 441/11 |
| 3,889,307 | A | * | 6/1975 | Houot | 441/25 |
| 3,933,109 | A | * | 1/1976 | Boisrayon et al. | 441/16 |

(Continued)

FOREIGN PATENT DOCUMENTS

GB        2001207 A    *    1/1979

(Continued)

OTHER PUBLICATIONS

Biomark.com, "A PIT (Passive Integrated Transponder)", two page website, 2004.

(Continued)

*Primary Examiner*—Darren W Ark

(57) ABSTRACT

By attaching a radio or acoustic sound transmitters, or combinations thereof, to the float line of nets recovery of gill nets will become much easier, and timely. This could save millions of fish and other marine life, as well as the economic value of lost nets, which can cost thousands of dollars a piece.

12 Claims, 4 Drawing Sheets

U.S. PATENT DOCUMENTS

Figure 1:
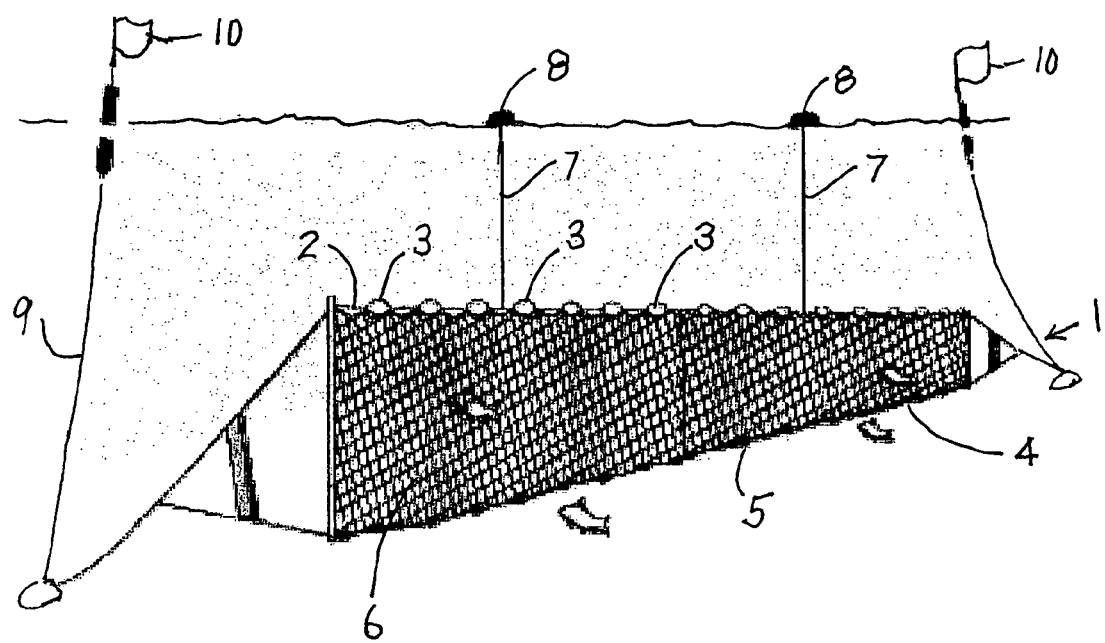

| | | | | |
|---|---|---|---|---|
| 3,936,895 | A | * | 2/1976 | Talkington ................... 441/21 |
| 3,972,231 | A | * | 8/1976 | Richardson .............. 73/170.04 |
| 4,003,289 | A | * | 1/1977 | Yamashita ..................... 87/12 |
| 4,034,693 | A | | 7/1977 | Challenger ................... 114/16 |
| 4,040,135 | A | * | 8/1977 | Arnold ........................ 441/26 |
| 4,056,801 | A | * | 11/1977 | Leisterer et al. ................ 367/4 |
| 4,095,421 | A | | 6/1978 | Silcox |
| 4,262,379 | A | * | 4/1981 | Jankiewicz .................. 441/23 |
| 4,583,314 | A | * | 4/1986 | Kirkland ........................ 43/25 |
| 4,596,085 | A | * | 6/1986 | Cotillier ........................... 43/4 |
| 4,619,066 | A | * | 10/1986 | Kirkland et al. ................ 43/25 |
| 4,630,289 | A | * | 12/1986 | Wren .......................... 441/11 |
| 4,649,744 | A | * | 3/1987 | Cotillier .................. 73/170.34 |
| 4,763,432 | A | * | 8/1988 | Barclay ......................... 43/10 |
| 4,777,819 | A | | 10/1988 | Hoyt ........................ 73/176 A |
| 4,805,657 | A | | 2/1989 | Carman et al. |
| 4,809,458 | A | | 3/1989 | Tanikuro et al. |
| 4,901,288 | A | * | 2/1990 | Baker et al. ..................... 367/4 |
| 4,945,520 | A | * | 7/1990 | Ford .............................. 43/4.5 |
| 4,980,989 | A | | 1/1991 | Davis ........................ 43/100 |
| 4,999,816 | A | * | 3/1991 | Dale et al. ...................... 367/4 |
| 5,003,514 | A | * | 3/1991 | Cotilla et al. ................... 367/4 |
| 5,014,248 | A | * | 5/1991 | Feltz et al. ...................... 367/4 |
| 5,022,013 | A | * | 6/1991 | Dalton et al. ................... 367/4 |
| 5,103,432 | A | * | 4/1992 | Percy ........................ 367/172 |
| 5,156,562 | A | * | 10/1992 | Pearson et al. ................. 43/25 |
| 5,163,858 | A | * | 11/1992 | Sumrall ........................ 441/11 |
| 5,218,366 | A | * | 6/1993 | Cardamone et al. ........... 441/11 |
| 5,231,781 | A | | 8/1993 | Dunbar ....................... 43/17.5 |
| 5,283,767 | A | * | 2/1994 | McCoy .......................... 367/4 |
| 5,301,166 | A | | 4/1994 | Charlton ........................ 367/1 |
| 5,406,294 | A | * | 4/1995 | Silvey et al. .................... 441/1 |
| 5,434,584 | A | | 7/1995 | Kelly ......................... 343/710 |
| H1533 | H | * | 6/1996 | Bowers et al. ............... 89/1.11 |
| 5,577,942 | A | * | 11/1996 | Juselis ........................... 367/4 |
| 5,663,927 | A | * | 9/1997 | Olson et al. ..................... 367/4 |
| 5,682,139 | A | * | 10/1997 | Pradeep et al. ......... 340/539.13 |
| 5,684,755 | A | * | 11/1997 | Saunders ....................... 43/9.2 |
| 5,734,121 | A | | 3/1998 | Balzarini ................... 114/21.3 |
| 5,838,275 | A | * | 11/1998 | Carmi ........................... 342/8 |
| 5,886,635 | A | * | 3/1999 | Landa et al. ............... 340/573.6 |
| 5,951,346 | A | * | 9/1999 | Woodall, Jr. ................. 441/11 |
| RE36,643 | E | * | 4/2000 | Olson et al. ..................... 367/4 |
| 6,138,397 | A | * | 10/2000 | Hammersland et al. ........ 43/9.1 |
| 6,170,436 | B1 | * | 1/2001 | Goodson et al. .............. 43/9.2 |
| 6,203,170 | B1 | | 3/2001 | Patrick et al. |
| 6,261,142 | B1 | * | 7/2001 | Fiotakis ....................... 441/11 |
| 6,298,767 | B1 | | 10/2001 | Porter |
| 6,402,692 | B1 | * | 6/2002 | Morford ..................... 600/301 |
| 6,532,192 | B1 | * | 3/2003 | Reid ........................ 367/127 |
| 6,543,177 | B1 | * | 4/2003 | King et al. ........................ 43/7 |
| RE38,475 | E | * | 3/2004 | Marshall ...................... 441/89 |
| 6,739,924 | B1 | * | 5/2004 | Groen et al. ................... 441/21 |
| 6,778,467 | B2 | | 8/2004 | Tokuda ........................ 367/97 |
| 6,791,490 | B2 | * | 9/2004 | King .......................... 441/26 |
| 6,795,113 | B1 | | 9/2004 | Jackson et al. .............. 348/207 |
| 6,917,294 | B2 | * | 7/2005 | Larsen ............................. 43/7 |
| 6,961,657 | B1 | * | 11/2005 | Wernli et al. .................... 367/4 |
| 7,054,230 | B1 | * | 5/2006 | Nelson ........................ 441/11 |
| 2002/0109601 | A1 | * | 8/2002 | Arens ....................... 340/573.1 |
| 2002/0116862 | A1 | | 8/2002 | McNeil ....................... 43/100 |
| 2003/0214881 | A1 | * | 11/2003 | Yang ........................ 367/134 |
| 2004/0045213 | A1 | * | 3/2004 | Mahoney ..................... 43/100 |
| 2004/0059476 | A1 | * | 3/2004 | Nichols ....................... 701/21 |
| 2004/0211413 | A1 | | 10/2004 | Monnich ............... 128/201.11 |
| 2004/0237374 | A1 | * | 12/2004 | Klein ......................... 43/21.2 |
| 2005/0223618 | A1 | * | 10/2005 | Mueller ........................... 43/4 |
| 2005/0285739 | A1 | | 12/2005 | Velhal et al. ............. 340/572.1 |
| 2007/0064525 | A1 | * | 3/2007 | Sanders et al. ................. 367/4 |
| 2007/0132577 | A1 | * | 6/2007 | Kolavennu ............. 340/539.13 |
| 2007/0139191 | A1 | * | 6/2007 | Quatro ................. 340/539.13 |
| 2007/0202838 | A1 | * | 8/2007 | Zancola et al. ......... 340/539.13 |
| 2007/0234632 | A1 | * | 10/2007 | Strickland ........................ 43/8 |
| 2008/0117082 | A1 | * | 5/2008 | Su .............................. 340/984 |

FOREIGN PATENT DOCUMENTS

| | | | | |
|---|---|---|---|---|
| JP | 02183192 | A | * | 7/1990 |
| JP | 05276851 | A | * | 10/1993 |
| JP | 08266191 | A | * | 10/1996 |
| JP | 09070242 | A | * | 3/1997 |
| JP | 10084814 | A | * | 4/1998 |
| JP | 2000000052 | A | * | 1/2000 |
| JP | 2000147117 | A | * | 5/2000 |
| JP | 2004020248 | A | * | 1/2004 |

OTHER PUBLICATIONS

Biotrack.co.uk, "Biotrack BTI and BTG Receivers", two page website, 2004.

Biotrack.co.uk, "Implantable Tubes", two page website, 2004.

Biotrack Ltd., "Biotrack Fish Ingestible/Implant Tags", one page advertisement, 2004.

Biotrack.co.uk, "Mammal Radio-Tags", two page website, 2004.

Brown, Peter et al, "Operational Field Trials of GPS Equipped Sonobuoys" ("TrackTags™"), navsys.com, *Proceedings of Royal Institute of Navigation RIN01 Conference on Animal Navigation*, Oxford, UK, Apr. 2001, 7 pages.

Castro; Kathleen and William; Erik, "Bycatch", Rhode Island Sea Grant Fact Sheet, P1391, University of Rhode Island, Graduate School of Oceanography, 2003.

Delaware Department of Natural Resources and Environmental Control (DNREC), "Recreational Gill Net", 2 page website, 2004.

Gadgets.co.uk, "Deluxe Micro Remote Controlled Submarine", 2 page website, 2004.

Godfreydykes.info, "A Boat Depth—Take Two", one page website, 2004.

HorseshoeCrab.org, "The Horseshoe Crab—Tags Help Researchers Understand Horseshoe Crab Populations", two page website, 2004.

Jones, Edwin C., "Ionospheric Physics of Radio Wave Propagation", Dept. of Physics and Astronomy, University of Tennessee, Knoxville, TN37996, 12 pages, 2004.

Martin, Glen, "Commercial Gill-Net Ban Tightened in California Move to Protect Wildlife Made at End of Season", Californiafish.org, 2 page website, Sep. 13, 2000.

Miseagrant.org, "Know Your Nets", one page website, 2002.

National Fisheries Conservation Center, "9 The Pinger Solution", pp. 52-64, Nov. 21, 2000.

Nielsen, John, "Team Hunts Deadly 'Ghost Nets' in the Pacific", National Public Radio (NPR), one page news release, May 31, 2005 (published after Applicants' provisional filing).

pooltoy.com, "Micro Submarine by MegaTech", one page website, 1998-2004.

Reid, James P. et al, United States Geological Survey (USGS) South Florida Information Access, Movements and Habitat Southwest Florida; Implications for Restoration Assessment, 8 page website, 2004.

San Francisco Maritime National Park Assoc., "AN/ARC-4 Radio Telephone Equipment (WE-233A)", 4 page website, 1996-2002.

San Francisco Maritime National Park Assoc., "A Catalog of Electronics Abound USS Pampanito" 9 page website, 1999-2002.

San Francisco Maritime National Park Assoc., "RAK Series Radio Receiving Equipments," 5 page website, 1996-2002.

Sacoast.owc.ac.za, "Gill Nets", one page website, 2004.

Savethemanatee.org, "Tracking Manatee Movement", one page website, 2004.

Spinets.net, "SPI Monofilament Nylon Gill Nets", two page catalog website, 2004.

Straus, Robert E., "Radio Operations Aboard Submarines," R3H4N, two page website, 2000.

United States Geological Survey (USGS), Northern Prairie Wildlife Research Center, "A Critique of Wildlife Radio-tracking and its use in National Parks", 5 page website, 2004.

Gill net diagram, University of Rhode Island, Graduate School of Oceanography, Kingston, RI, one page illustration, 2004.

"Marine Debris of the Northwestern Hawaiin Islands: Ghost Net Identification" Timmers, Kistner, Donohue. Sea Grant Publication UNIHI SEAGRANT AR 05 01. Upon Information belief this was published Jan. 2005. Applicant's first U.S. Appl. No. 60/647,833, filed Jan. 27, 2005.

* cited by examiner

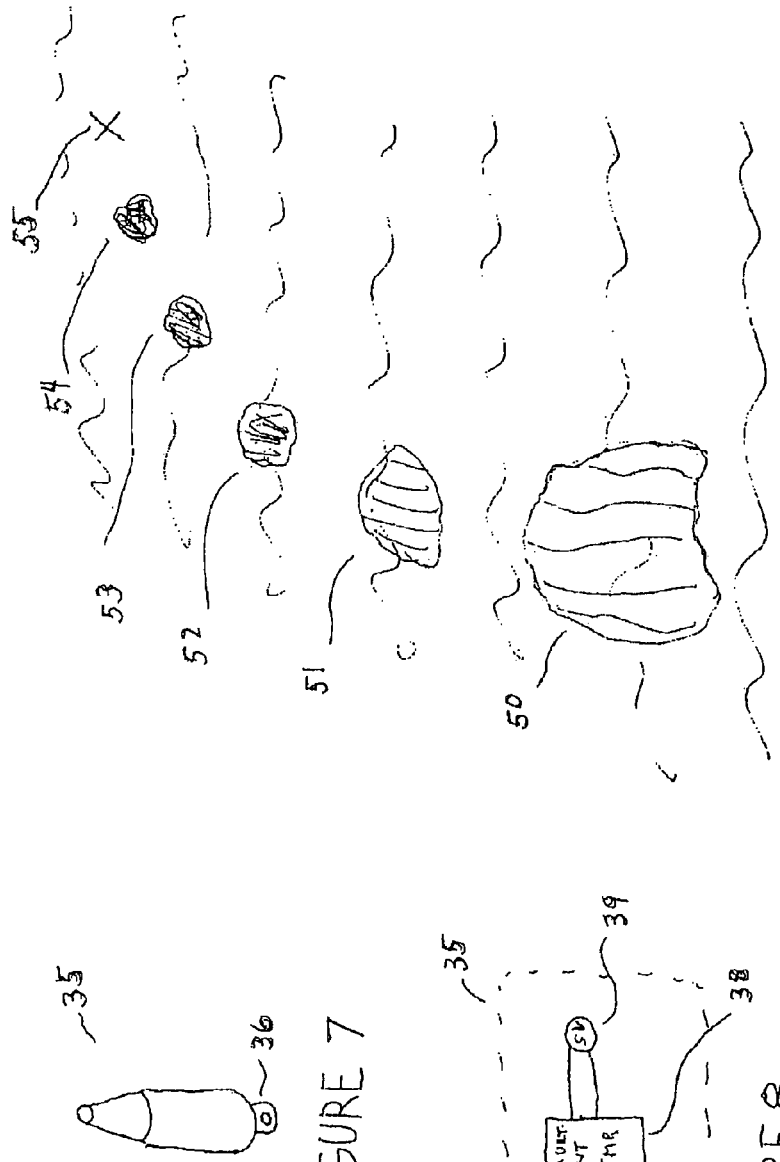
FIGURE 9
FIGURE 7
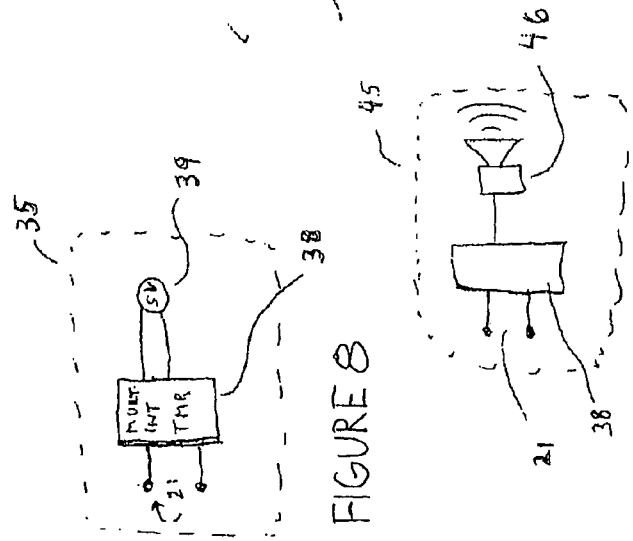
FIGURE 8
FIGURE 10

RADIO CONTROLLED GILL NET RECOVERY TRANSMITTERS

CROSS REFERENCE TO RELATED APPLICATIONS

This application claims the benefit, Under 35 U.S.C. 119 (e) of U.S. Provisional Application No. 60/664,147, filed Mar. 22, 2005 and U.S. Provisional Application No. 60/647,833, filed Jan. 27, 2005, which are hereby incorporated by reference.

FIELD OF THE INVENTION

The present invention relates to locating lost fishing gill nets at sea and preventing wildlife from being trapped therein.

BACKGROUND

Gill nets are nets that use a wide mesh to entangle or trap fish. These nets may be as long as 13,000 meters. The mesh is designed to allow a fish's head to fit through, but not the body. When a fish tries to back out from the meshing its gills will become caught in the net. Often fish will just become entangle in this loose mesh. The meshing of a gill net is tied in between two lines. One line is weighted; this is called the lead line. Another line has buoys attached to it; this is called the float line. The buoyant forces of the float line hold the net upright in the water, while the lead line anchors the net. Gill nets can fish the surface, bottom, or midwater of most types of bodies of water, such as bays, harbors and the open ocean. Some gill nets are anchored to the bottom, but many are free floating. Gill nets are placed in the water by a fishing vessel then retrieved at a later time, most often the next day. Both anchored and free floating gill nets can become lost due to storms, tides, currents, poor attachment of anchors or floats, or entanglement with other vessels or fishing gear. When these nets become broken or lost they continue to serve as effective traps. Lost nets or pieces of nets are called "ghost nets" these nets can continue to kill fish, turtles, birds, and marine mammals for several years.

OBJECTS OF THE INVENTION

It is therefore an object of the present invention to provide a device and method for locating lost fishing gill nets at sea.

It is also an object of the present invention to prevent the entanglement of fish and other wildlife in lost gill nets floating in the sea.

Other objects which become apparent from the following description of the present invention.

SUMMARY OF THE INVENTION

By attaching a radio transmitter to the float line of nets recovery of gill nets will become much easier, and timely. This could save millions of fish and other marine life, as well as the economic value of lost nets, which can cost thousands of dollars a piece.

BRIEF DESCRIPTION OF THE DRAWING FIGURES

Drawing FIG. 1 is a perspective view of a prior art drawing of a gill net 1 from the "miseagrant" website. FIG. 1 shows the gill net 1 having an upper float line 2 with floats 3 and a lower weighted lead line 4 with weights 5, with the netting mesh 6 in between. Above the float line 2 are lines 7 connected to floating buoys 8 and lines 9 connected to display flags 10. The floats 3, buoys 8 or flats 10, can break away from the float line 2, buoy lines 7 or flat lines 9, causing the gill net 1 to float away undetected below the surface of the sea.

Figure 2:
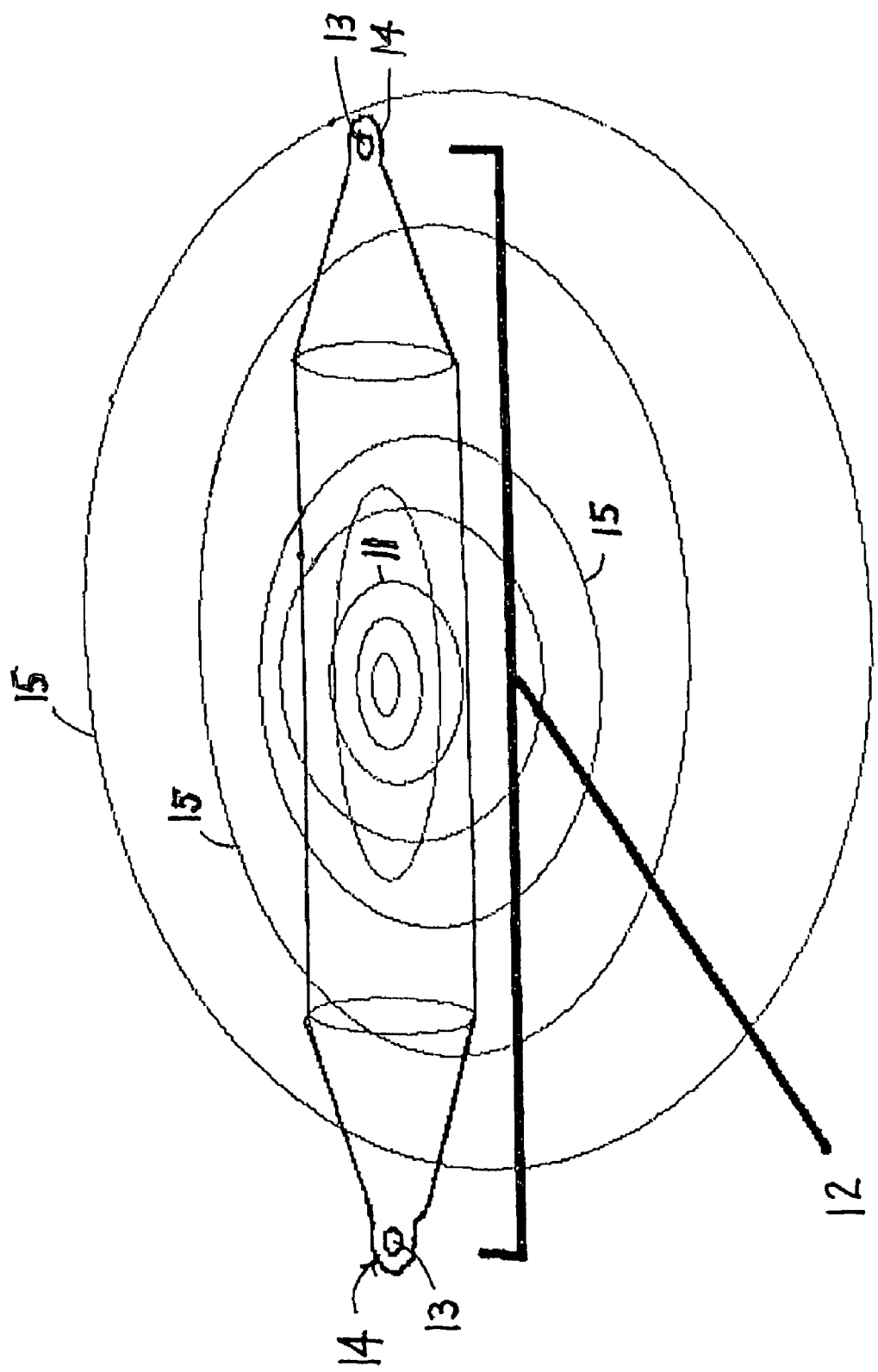

Drawing FIG. 2 is a representative drawing of an example for a typical gill net recovery system showing a radio transmitter 11 inside of a tubular container body 12 with fastener holes 13 at each end 14 of body 12 to attach the radio transmitter 11 to the float line 2 in place of one of the existing floats 3 normally located on the float line 2 above the netting strings 6 of the gill net 1.

Drawing FIG. 2 also shows radio waves 15 being transmitted from the radio transmitter 11. Other shapes may be made to the radio transmitter, or other connections may be made between the radio transmitter and the gill net, without departing from the scope of this invention.

Figure 3:
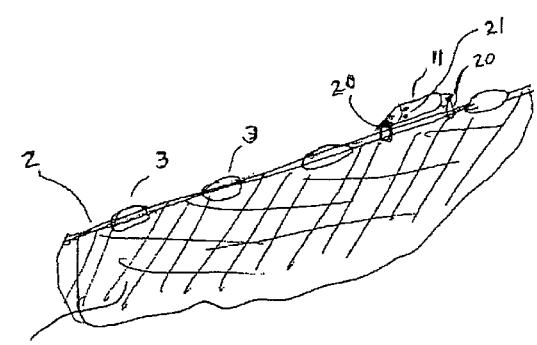

Drawing FIG. 3 shows a buoyant radio transmitter body 11 attached to the float line 2 with strong loops 20.

Figure 4:
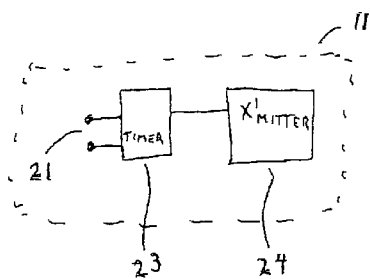

Drawing FIG. 4 is a block diagram for an initial delay timer 23 inside of the buoyant radio transmitter body 11 to initially delay starting radio transmissions to help track the movement of a lost gill net 1.

Figure 5:
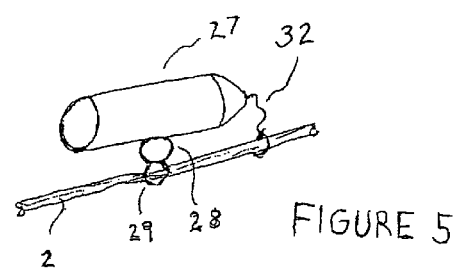

Drawing FIG. 5 shows another version for a gill net tracker with a buoyant radio transmitter body 27 for gill nets in deep water where radio transmission do not transmit through the depths of the sea. It can be released by releasable clamps 29 from float line 2 and then float to the surface of the sea and send out radio signals.

Figure 6:
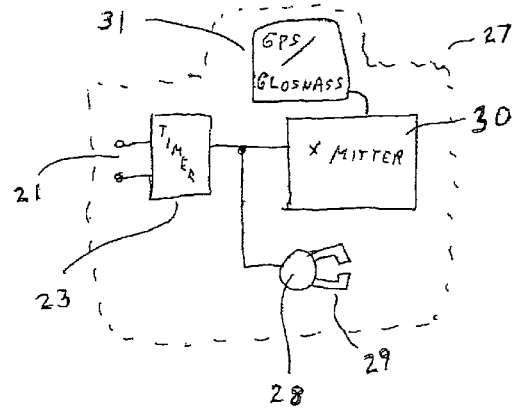

Drawing FIG. 6 is a flow chart diagram for the deep sea gill net tracker version of drawing FIG. 5.

Drawing FIGS. 7, 8 and 9 show a type of tracking device shown in drawing FIG. 7 that emits biodegradable colored dye at timed intervals due to the multi-interval timer of drawing FIG. 8, leaving a trackable visual trail of dye spots shown in drawing FIG. 9.

Drawing FIG. 10 shows a diagram for an acoustic sound transmitter version sending out trackable acoustic signals from a gill net floating deep below the surface of the sea.

DETAILED DESCRIPTION OF THE PREFERRED EMBODIMENTS

By attaching a radio transmitter to the float line of nets recovery of gill nets will become much easier, and timely. This could save millions of fish and other marine life, as well as the economic value of lost nets, which can cost thousands of dollars a piece.

Typical radio transmitters communicate remotely with a radio receiver. These transmitters are useful for the radio controller gill net recovery transmitter of this invention. Examples of these radio transmitters are transmitters using satellite uplink monitored tracking systems, or other radio telemetry or VHF radio remote locators. These radio transmitters are often tagged onto wildlife to track the locations of the wildlife.

These systems are discussed in "A Critique of Wildlife Radio-tracking and its Use in National Parks", United States Geological Survey, Northern Prairie Wildlife Research Center, 2002. These systems include a transmitter tagged by a collar or by a surgical implant below the skin of the animal being tagged and tracked. The transmitter is powered continuously or intermittently by a power source, such as a battery, and sends radio signals to a remote electrically powered receiver. Useful tracking monitors for manatees are described in the "save the manatees" website. These useful manatee tracking monitors are also described by James R. Reid, Susan M. Butler, Dean E. Easton and Bradley M. Stith, in "Movements and Habitat Requirements of Radio Tagged Manatees in Southwest Florida; Implications for Restoration Assessment", at the Greater Everglades Ecosystem Restoration Conference of the United States Geological Survey, Center For Aquatic Resource Studies, Sirenia Project, April, 2003, concerning battery powered radio tracking of tagged manatees with Global Positioning Sensing (GPS) technology or with satellite monitored Argos tracking tags, VHF tracking tags and ultrasonic tracking tags. Other useful tracking radio transmitters include radio telemetry tags such as used by the DNREC Delaware Coastal Programs of the United States Geological Survey, US Fish and Wildlife Service and Cornell University in their study of horseshoe crabs in Delaware Bay.

These wildlife tagged tracking radio transmitters can also be used to send signals to radio receivers, for locating the ghost gill nets lost at sea.

Other useful global positioning sensors (GPS), include "Track Tags™" of Navsys Limited, as described by Peter K. Brown and Charles Bishop in "Track Tags™-A low-weight, long duration GPS recording device", 2001, of Navsys Limited of Edinburgh, Scotland, or "Sonobuoys" of Navsys Limited, as described by Peter Brown and Trevor Kirby-Smith, in "Operational Field Trials of GPS Equipped Sonobuoys", 1996, also of Navsys Limited of Edinburgh, Scotland. Other wildlife radio telemetry tags are made by manufacturer suppliers, such as Biomark Company of Boise, Idaho, Biotelemetrics, Incorporated of Boca Raton, Fla., Biotrack Limited of Dorset, England, Global Tracking Systems (GTS), Incorporated of Sylvan Lake, Alberta, Canada, H.A.B.I.T. Research, Limited of Victoria, British Columbia, Canada, Hydroacoustic Technology, Incorporated of Seattle, Wash., Microwave Telemetry, Inc. of Columbia, Md., Sirtrack Limited of Havelock North, New Zealand.

Part of a method to limit the damage to aquatic life should be to initiate international laws to assign a unique ID number to each net at time of manufacture and attach a tag with that number to the net in a fashion that would destroy the net if removed. The manufacturer would have to keep records of sale, and fines would be imposed on buyer if his ghost net is retrieved.

FIG. 3 shows a radio 11 attached to the float line 2 with strong loops 20. The radio 11 has two exposed contacts which will be connected through conductivity of sea water when net gets wet.

This triggers an interval timer 23 (shown in FIG. 4) which would start a radio transmitter 24 after an interval longer than normal retrieval times (say 50 hours if net should be retrieved in 24 hours). Note, no batteries are shown in diagrams, they should be added. This timer starts the transmitter which stays on until batteries go dead, sending continuously or at fixed intervals. It transmits coded signal identifying problem as a ghost net and transmits an identification ID number also if it exists. That way any agency receiving a radio signal could contact owner directly to advise retrieval operation. Signal can be received by satellite uplink, ship-board receivers, coastal receivers, etc. Triangulation measurements on a signal can be used to locate the lost gill net. This is only feasible if the gill net has a float line which is floating very close to the surface of the sea or if the float line is on the sea surface, since radio frequency RF waves do not penetrate water very well. An off switch of some sort is required to turn off the timer and the radio transmitter, so that the radio signal does not proceed if the gill net is retrieved either before or after a specified allotted time.

FIGS. 5 and 6 show the next version of a radio 27 which is attached to the float line 2 via a pair of clamping jaws 29 which can be opened by a solenoid or motor 28 after an interval timer times out. A connecting line 32 on an internal reel also attaches the radio 27 to the float line 2. Since the radio 27 is buoyant and floats, it would float to the sea surface while it is still attached via the connecting line 32 to the gill net. It would start transmitting a radio signal via radio transmitter 30. An optional GPS/GLOSNASS global positioning system receiver 31 can actually incorporate location information into a distress signal message. This system will work even for much submerged nets.

In rescue work reliability is very important. Redundancy provides security since if one thing doesn't work maybe another one will. In this sense, batteries should not be shared by modules. Each should be able to function on their own even if this is more expensive.

FIG. 7 shows a perceptible signal emitter housing 35, such as, for example, a dye emitter, which is attached to the gill net 6 securely via a loop 36. It emits a perceptible signal, such as a biodegradable dye in spurts which float to the surface.

FIG. 8 shows a multi-interval timer 38 which controls a solenoid valve 39 to emit each squirt. Timer 38 has a long initial interval initiated by contacts 21 getting wet, then it produces short pulses at a short interval (such as each hour).

FIG. 9 shows the blotches on the surface of the sea in a case where the ghost gill net 55 is actually moving. Old blotch 50 has spread out, but more recent blotches are darker and smaller 51-54. This is a good secondary locator if radio 27 were to get detached from net 55. A helicopter may be able to see the blotches in vicinity.

FIG. 10 shows an alternate embodiment for an acoustic sound wave pinger similar to those attached to airline black boxes. This is also attached to the gill net 55 and it functions like dye emitter, but it emits successive acoustic sounds deep under the sea. These acoustic sounds can be located and triangulated by surface boats or helicopters dragging an array of hydrophones which listen to acoustic sounds under the sea. The acoustic sounds would drift with the gill net if it is moving and successive triangulation would indicate direction and drift velocity of the gill net.

Another technique is to attach several radios 27 of FIG. 5 to a net, each with a time interval longer than the next. The attached tether also becomes optional in this scheme. The floating radios would be detached one at a time without tethers at given intervals (perhaps every 4 hours). Each would float to the surface and start transmitting. The distress message will also state that this is radio "3" or whatever interval it happens to be. In this way, even without GPSS, a trail will be marked by a number of radio signals at successive locations pointing to the progressive movement of ghost gill net 55. Each signal identifies the drift direction and velocity of the trail of the gill net. By knowing which interval of each radio signal location, then one knows which way the gill net is moving. Therefore if each transmission signal is encoded with each particular transmitter, its location and movement can be determined and extrapolated in a potential trail of the moving gill net.

In addition, a similar technique detaching floating strobe lights from the gill net at given intervals could also visually indicate the trail of the direction and movement of the gill net drift, which can be detected day or night. These strobe lights would float to the surface one at a time and start flashing. The flashing pattern encodes the sequence in which it were released. The first released would emit a single flash every two seconds, for example. The second strobe released would flash two flashes separated by half a second, then another two flashes after two seconds and so forth. In this way, if any two strobes are detected, the gill net drift direction can be established.

These radio transmitters attached to gill nets could save millions of fish and other marine life, as well as the economic value of lost nets, which can cost thousands of dollars a piece.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

The invention claimed is:

1. A recovery device in combination with and for locating and recovering a gill net lost at sea, comprising in combination:
   a gill net having a netting mesh, an upper float line, and a lower weighted lead line along upper and lower edges, respectively, of said mesh;
   floats attached to said upper float line, and weights attached to said lower weighted lead line whereby said gill net floats below a surface of said sea;
   floating buoys attached to said gill net to mark location of said gill net under said sea surface;
   means for tracking the location of said gill net in the event that said gill net breaks away from said buoys and floats away undetected below the surface of said sea comprising a radio transmitter within an enclosed container body attached to said upper float line;
   a timer within said container body to initiate radio transmission by said radio transmitter after a normal retrieval time for said gill net has elapsed indicating that said gill net is floating undetected under said sea and allowing tracking of said gill net.

2. A gill net recovery device in combination with and for locating and recovering a gill net lost at sea, comprising in combination:
   said gill net having a net with openings for catching fish gills therein, said net having a netting mesh, an upper float line with floats attached to the net and a lower weighted lead line with weights, with the netting mesh in between said upper float line and said lower weighted lead line, the gill net further having lines connected to one more floating buoys and lines connected to one or more display flags for floating above the upper float line, wherein the floats, the one or more floating buoys and/or one or more display flags can break away from the upper float line, lines connected to one or more floating buoys or lines connected to one or more display flags, causing said gill net to float away undetected below a surface of the sea,
   at least two radio signal transmitters for transmitting radio signals to a remote receiver and located inside respective buoyant container bodies;
   wherein said buoyant container bodies are releasably attached to said upper float line and adapted to float to the surface of the sea and allow said at least two radio signal transmitters to transmit said radio signals;
   wherein said buoyant container bodies comprise releasable attachment means and interval timers, said releasable attachment means comprising at least one fastener, each of said buoyant container bodies attached by said at least one fastener to said upper float line above the netting mesh of the gill net, said interval timers activate the releasable attachment means to release said buoyant container bodies and radio transmitters therein from the upper float line at an end of a fixed time period controlled by the interval timers and permitting each said radio transmitter of each said buoyant body to send out a locator signal incorporating a numerical sequence in which each said buoyant body was released freely from said gill net; and
   wherein each said radio transmitter automatically begins transmitting said locator signal which defines a trail over time of the lost gill net to support tracking and identifying an exact path, velocity and location of said gill net from which the floating bodies and respective radio transmitters were releasably detached.

3. The gill net recovery device in combination with and for locating and recovering a gill net lost at sea as in claim 2 wherein each said buoyant container body comprises a substantially tubular body.

4. The gill net recovery device in combination with and for locating and recovering a gill net lost at sea as in claim 2 wherein each said radio transmitter communicates with at least one satellite tracking system, at least one radio telemetry locator, at least one radio remote locator or any combination thereof.

5. The gill net recovery device in combination with and for locating and recovering a gill net lost at sea as in claim 2 wherein said gill net comprises a unique identifiable ID identifier attached to each net.

6. The gill net recovery device in combination with and for locating and recovering a gill net lost at sea as in claim 2 wherein each said radio transmitter inside each respective buoyant container body has two contacts adapted to complete an electrical circuit when contacted by sea water and trigger the respective interval timer when said gill net contacts sea water, said contacts triggering the respective interval timer starting each said radio transmitter inside each respective buoyant container body after a predetermined interval longer than the fixed time period, each said interval timer starting each said radio transmitter which sends steady or intermittent signals until a DC power source of each said radio transmitter is exhausted, said at least two radio transmitters transmitting coded signals identifying said lost moving gill net.

7. The gill net recovery device in combination with and for locating and recovering a gill net lost at sea as in claim 2 wherein said remote receiver locates each said respective radio transmitter by triangulation to locate the lost gill net.

8. The gill net recovery device in combination with and for locating and recovering a gill net lost at sea as in claim 2 wherein said at least one fastener comprising opposing clamping jaws, each said buoyant container body is attached to the float line via said opposing clamping jaws openable by an actuator after said respective interval timer times out, each said buoyant container body also connected to the float line by a respective connecting line on an internal reel attached to said buoyant container body, each said container body floatable to the sea surface while attached to said float line via said respective connecting line to the gill net.

9. The gill net recovery device in combination with and for locating and recovering a gill net lost at sea as in claim 2 further comprising a global positioning system receiver within each said buoyant container body incorporating location information into a distress signal message whereby the present location of each said radio transmitter of each said buoyant container body can be incorporated into the locator signal being emitted.

10. The gill net recovery device in combination with and for locating and recovering a gill net lost at sea as in claim 2 wherein each of said at least two radio signal transmitters is released to said sea surface at a different time, while being tethered to said moving gill net by a tether.

11. The gill net recovery device in combination with and for locating and recovering a gill net lost at sea as in claim 10 wherein said at least two radio signal transmitters are detachable from said gill net at predetermined intervals as said gill net moves within the sea water, each said radio signal transmitter floating to the sea surface and starting transmitting after said respective predetermined intervals, the transmitted radio signals leaving a perceptible trail observable by a number of cumulative signals pointing to the movement of the gill net.

12. A method for locating and recovering a gill net lost at sea, comprising the steps of:

suspending a free floating gill net in a sea and below a surface of said sea, said gill net having a netting mesh, an upper float line, and a lower weighted lead line along upper and lower edges, respectively, of said mesh;

attaching floats to the upper float line, and weights to said lower weighted lead line allowing said gill net to float freely beneath said surface of said sea;

attaching floating buoys to said gill net to mark location of said gill net under said sea; and attaching to said gill net a radio transmitter within an enclosed container body, said container body including a timer initiating radio transmission by said radio transmitter after a normal retrieval time for said gill net has elapsed indicating that said gill net is floating undetected under said sea thereby allowing tracking of said gill net.

\* \* \* \* \*